US 7,843,094 B2

(12) United States Patent
Goodzeit et al.

(10) Patent No.: US 7,843,094 B2
(45) Date of Patent: Nov. 30, 2010

(54) DUAL ARMATURE MOTOR/GENERATOR WITH FLUX LINKAGE BETWEEN DUAL ARMATURES AND A SUPERCONDUCTING FIELD COIL

(76) Inventors: Carl L. Goodzeit, 1409 Yardley Pl., DeSoto, TX (US) 75115; Millicent J. Ball, 1415 Country Ridge Dr., DeSoto, TX (US) 75115

( * ) Notice: Subject to any disclaimer, the term of this patent is extended or adjusted under 35 U.S.C. 154(b) by 0 days.

(21) Appl. No.: 12/586,103

(22) Filed: Sep. 17, 2009

(65) Prior Publication Data

US 2010/0259117 A1    Oct. 14, 2010

Related U.S. Application Data

(60) Provisional application No. 61/168,025, filed on Apr. 9, 2009.

(51) Int. Cl.
*H02K 9/00* (2006.01)
(52) U.S. Cl. .......................... 310/52; 310/112
(58) Field of Classification Search .................. 310/52, 310/112, 113, 114, 115, 198
See application file for complete search history.

(56) References Cited

U.S. PATENT DOCUMENTS

| | | | |
|---|---|---|---|
| 3,742,265 A | 6/1973 | Smith, Jr. | |
| 3,816,780 A | 6/1974 | Smith, Jr. et al. | |
| 3,898,490 A | 8/1975 | Wedman | |
| 4,001,617 A | 1/1977 | Boyer | |
| 4,117,357 A * | 9/1978 | Baumann | 310/52 |
| 4,126,798 A | 11/1978 | Carr, Jr. et al. | |
| 4,237,392 A * | 12/1980 | Ying et al. | 310/52 |
| 4,267,473 A * | 5/1981 | Gamble | 310/52 |
| 4,464,617 A | 8/1984 | Yantovsky et al. | |
| 4,642,503 A * | 2/1987 | Ueda et al. | 310/214 |
| 4,808,864 A | 2/1989 | Brunet et al. | |
| 6,710,492 B2 | 3/2004 | Minagawa | |
| 7,315,103 B2 | 1/2008 | Qu et al. | |
| 7,400,077 B2 | 7/2008 | Caroon | |
| 2008/0161189 A1 | 7/2008 | Lewis et al. | |
| 2009/0295168 A1 * | 12/2009 | Meinke et al. | 290/55 |

* cited by examiner

*Primary Examiner*—Nguyen N Hanh
(74) *Attorney, Agent, or Firm*—Hemingway & Hansen, LLP; D. Scott Hemingway

(57) ABSTRACT

The present invention relates to cylindrical rotating electric machines which comprise armature and field coils, with either the field coil or the dual armature being the rotating component. The dual armature is composed of two concentric cylindrical sets of coils with the field coil situated in the gap between the inner and outer armature sections. Relative rotational motion between the field and armature coils can be achieved by having either one be the rotor. By using two armature coil sections, one inside the field coil aperture and the other external to the field coil, the flux linkage between the armature and superconducting field coil can be approximately doubled. This is a more efficient use of the superconductor. The increased flux linkage in the invented technology produces a substantially higher power density than can be obtained with current conventional superconducting machine technology.

23 Claims, 4 Drawing Sheets

DUAL ARMATURE MOTOR/GENERATOR WITH FLUX LINKAGE BETWEEN DUAL ARMATURES AND A SUPERCONDUCTING FIELD COIL

RELATED APPLICATION DATA

This application is related to Provisional Patent Application Ser. No. 61/168,025 filed by Carl Leonard Goodzeit on Apr. 9, 2009 entitled "Split Rotor Motor/Generator," and priority is claimed for this earlier filing under 35 U.S.C. §119(e). The Provisional Patent Application is also incorporated by reference into this utility patent application.

TECHNICAL FIELD OF THE INVENTION

This invention relates to a dual armature electric motor or generator with flux linkage between the dual armatures and a superconducting field coil for applications in propulsion motors for marine, air, and land vehicles, or for electric power generation in wind power and hydroelectric generating stations.

BACKGROUND OF THE INVENTION

A cylindrical, rotating electrical machine consists of a field coil that produces a magnetic field and an armature. The armature consists of a series of current loops in the form of a coil that links the magnetic flux produced by the field coil. Relative rotational motion between the armature and the field coil then produces a generated voltage in the armature due to the rate of change of flux linkage in the armature coils. The power of the machine is proportional to the square of the generated voltage that is produced in the armature. Rotating machines are usually AC (synchronous) or DC types.

For example, in a "synchronous machine" such as a conventional AC generator, a rotating field coil is situated within the aperture of a stationary armature, which may contain multi-phased coils. The rotating field interacts with the stationary armature to produce a sinusoidal-varying voltage in the armature coils.

Another example of a rotating machine is a conventional DC-type machine in which a rotating armature is located in the aperture of a stationary field coil. The armature coils in this case also experience a generated alternating voltage, but the armature current is rectified by commutation or by external rectification to produce a voltage that is substantially DC.

It is seen that the synchronous machine derives its armature flux linkage from the field external to the field coil, while the "DC type" machine derives its armature flux linkage from the field inside the aperture of the field coil. This amounts to "wasted flux" in both cases because the field on the inside of the field coil of the synchronous machine is not linked to the coils of the armature and the field on the outside of the field coil in the "DC type" machine is not linked to the coils of the armature.

In the case of DC machines, there are two configurations that have been used that include a superconducting field coil with a non-superconducting armature or rotor. One is the homopolar machine with a superconducting field coil and a high-current resistive rotor that connects to an external circuit. In this case there is only one effective current path in the rotor and thus the machine can only produce power at low voltage and high current. However, the current is a constant voltage DC. The second type of DC machine can be considered as a rectified AC machine that uses, for example, a three-phase winding for the armature coils, coupled with a full-wave three-phase rectifier.

A known example of the homopolar motor is described by Michael J. Superczynski, Jr., and Donald J. Waltman in IEEE Transactions on Applied Superconductivity, Vol. 7, No. 2, June 1997, "Homopolar Motor with High Temperature Superconductor Field Windings". The machine described in Sperczynski uses a rotor that is supplied by 30,000 A of current in order to produce the desired power. This high current is necessary because the rotor provides only a single current path through the magnetic field, and the output power is proportional to the total current, the field strength, and the length of the current path in the rotor. Thus, the output of the machine of a fixed size and magnetic field can only be increased by increasing the current passing through the rotor.

An externally excited DC machine, using the principle of rectified AC with a superconducting field coil and a normal-conducting armature is disclosed in U.S. Pat. No. 5,032,748, Jul. 16, 1991, to Sakuraba et al.

Lewis and LeFlem describe a superconducting electrical machine of the synchronous type in patent application document US 2008/0161189A1, which was published Jul. 3, 2008. The device described in Lewis is a synchronous electrical machine with a rotating field coil that comprises two concentric cylindrical coils and a stationary single armature coil that is situated in the gap between the two field coils. This split field coil configuration allows the armature to link the same amount of flux that can be linked from an un-dual field coil that must operate with a higher field than either of the dual field coils. In this case, the operating margin of the field coils is increased because they can now run at a lower current that does not exceed the critical current density in the superconductor. This approach is designed to allow more choices for superconductor, but this configuration does not significantly change the power density of the machine since the armature does not link with all of the field flux.

Caroon describes a prior art configuration in U.S. Pat. No. 7,400,077. This Caroon machine has a central rotatable axle, a first 'field armature' disposed around and attached to the axle, a second 'field armature' that is disposed around the first field armature and also attached to the axle, and a stationary 'electromagnetic member' that is disposed between the first and second field armatures and is attached to the machine housing. The 'field armatures' each contain a plurality of field magnets while the electromagnetic member includes a plurality of electromagnets. The arrangements of field magnets and electromagnets on the rotors and stator are much more complex than those described in the present invention.

Minagawa describes a prior art configuration in U.S. Pat. No. 6,710,492. This Minagawa machine claims a stator with a plurality of coils that are supplied with a polyphase AC current to cause two rotors with different arrangements of magnets and coils to move independently of each other. In the claims, the two rotors are coaxial and concentric in some configurations and undefined in other claims. The position of the stator is also not defined in any of these claims. The description of the machine in the text shows a triple layer structure with the stator positioned between these two rotor coils but in the final paragraphs it is stated that "it is possible to apply the invention to a motor/generator disposing two rotors coaxially." The arrangements of magnets and coils on the rotors and stator are much more complex than those described in the present invention.

Smith describes a prior art configuration in U.S. Pat. No. 3,742,265 This machine claims various arrangements of three concentric and coaxial cylindrical elements, of which one is a superconducting field winding and the other two are normal conducting armatures. Some of the claims describe placement of the field winding in the center between the two armature windings, however, the stated objective in claim 1 is not the same as the present invention, which operates differently to produce a different functional result. The present invention can also use all superconducting elements or field coils, and the present invention can also use normal conductors in armatures.

SUMMARY OF THE INVENTION

This invention relates to cylindrical rotating electric machines which comprise armature and field coils, with either the field coil or the dual armature being the rotating component. The dual armature is composed of two concentric cylindrical sets of coils with the field coil situated in the gap between the inner and outer armature sections. The single field coil is placed in a radial gap between two concentric cylindrical armature coils.

Relative rotational motion between the field and armature coils can be achieved by having either one be the rotor; the preferred configuration would be for the armature coils to be the rotor. By using two armature coil sections, one inside the field coil aperture and the other external to the field coil, the flux linkage between the armature and superconducting field coil can be approximately doubled. This is a more efficient use of the superconductor. The increased flux linkage in the invented technology produces a substantially higher voltage than can be obtained with current conventional superconducting machine technology.

This arrangement links flux from the field coil to the armature sections in both the inner and outer regions of the field coil. Thus, a machine of this configuration can effectively double the amount of flux linked between the field and the armature as a conventional machine of the same size that links flux on only one side of the field coil.

The dual armature is generally the rotating member of the machine and can be comprised of superconducting coils, resistive coils operating at cryogenic temperature, or resistive coils operating near ambient temperature. The field coil is generally a stationary superconducting coil and operates at a steady state excitation current to produce a strong magnetic field in its aperture and external to the coil. Although the flux density in the aperture is higher than that outside the field coil, the total amount of flux in both spaces is the same, and this total flux can be linked by the coils of the inner and outer sections of the dual armature.

A specific embodiment of the present invention discloses superconducting electric machines that use a plurality of multi-turn coils in an armature located in an externally excited magnetic field. The armature is a dual configuration of two concentric cylindrical sections with the field coil placed between them.

The superconducting field coil is mounted in a cryogenic containment vessel. If the armature coils are to be at a higher temperature, this cryogenic vessel will be sized to fit in the space between the two sections of the dual armature. This cryogenic containment vessel with the field coil is called the cold mass and is supplied with a cryogen to allow operation at superconducting temperatures. The cold mass is mounted in a vacuum vessel whose outer walls may comprise the frame of the machine. The reaction torque of the stationary field coil is transmitted to the frame of the machine by means of a low heat leak, high torque support system.

The armature coils may be enclosed within their own cryogenic vessel so that they can be cooled by a separate cryogenic supply/exhaust system that permits them to operate at a temperature different than that of the field coil. The armature rotor is supported from the exterior frame of the machine by means of support members with bearings to allow it to rotate freely.

A primary objective is to provide improved electric machines by using a superconducting field coil (stator coil) in conjunction with a dual armature that can provide almost twice the flux linkage between the armature and the field coil. The invented technology provides a substantially increased power density from the same size machine that uses conventional configurations.

A secondary objective is to provide improved electric motors for use in marine, air, and land vehicle propulsion by using a superconducting machine that can provide a large amount of power at high voltage even at very low operating speed.

A third objective is to provide improved electric power generators for wind or hydroelectric power sources by using a superconducting machine that can provide a large amount of power at high voltage even at very low operating speed.

A fourth objective is to provide improved electric machines that use superconducting coils in both the stator and rotor, thus increasing the power density, reducing the mass of the machine, and increasing the overall electrical efficiency.

A fifth objective is to provide a fully superconducting electric machine (i.e. superconducting field and rotor coils) that is especially suitable for the use of high temperature superconducting (HTS) materials. This fully-superconducting machine achieves a very high power to mass ratio and can operate at the higher range of cryogenic temperatures for superconducting materials. These HTS materials are inherently brittle in nature and suffer degradation of superconducting properties when specified strain limits are exceeded. The geometry of the double-helix superconducting multi-turn coils that can be used in this invention is especially suitable for the application of high temperature superconductors since the coils can be easily designed so that the coil winding process will accommodate the allowable minimum bend radius that will prevent degradation of the superconductor.

A sixth objective is to provide an electric machine with a superconducting field coil with a low enough heat leak (i.e. gain from external sources) so that it can benefit from the use of low temperature superconducting materials such as NbTi. This is accomplished by providing a high torque, low heat leak support system to handle the reaction torque on the field coil.

One end of the armature assembly is generally provided with a high torque capacity coupling to transmit mechanical power to or from an external device by means of a high torque capacity, low heat leak shaft assembly. The opposite end of the rotor is provided with a low heat leak extension tube that extends through the vacuum tank to ambient temperature. Electrical connections are provided between the armature coils and the slip rings and brushes mounted on the ambient temperature region of the extension tube. The extension tube can also contain provisions for supplying and exhausting cryogenic fluid from the rotor containing the armature coils.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
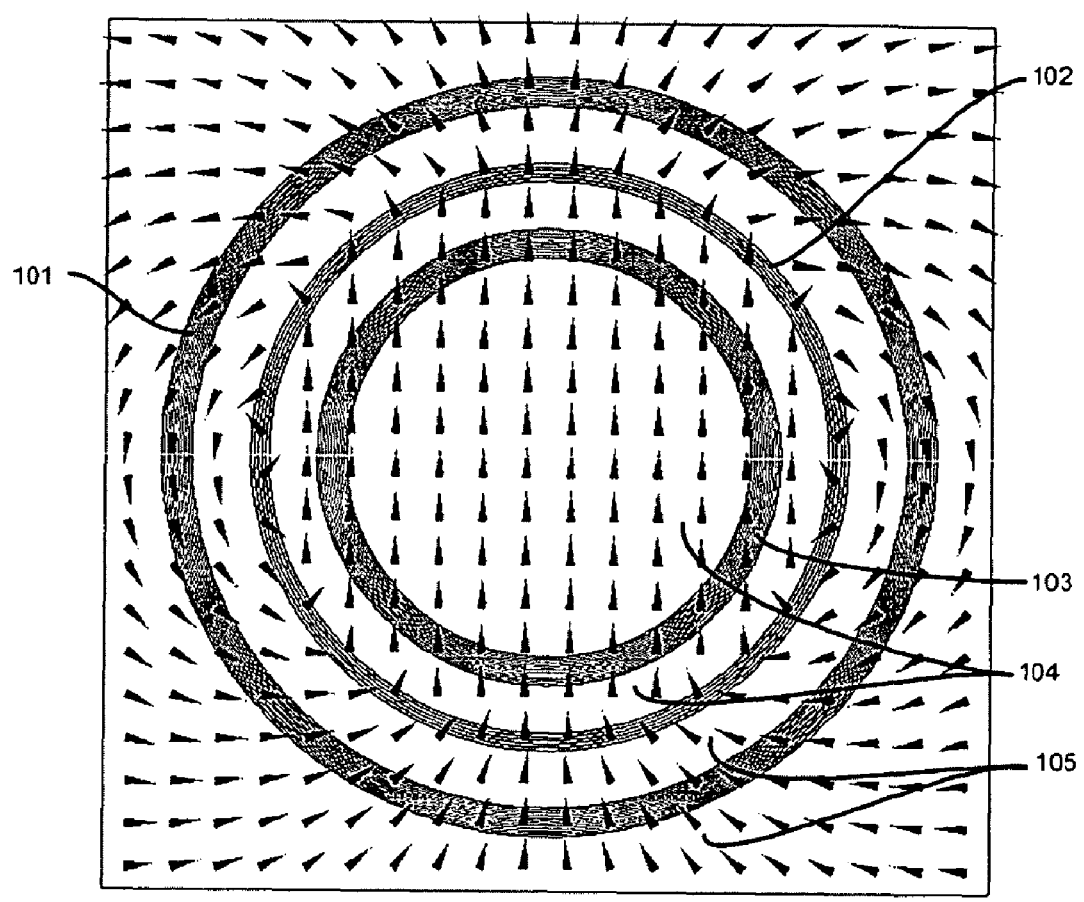
FIG. 1 is a cross-sectional diagram that shows the magnetic field produced by the field coil and the flux linkage with the inner and outer sections of the dual armature.

The preferred embodiment of this invention is a 2-pole machine that contains a rotating armature with three 2-pole coils in each of the two concentric rotor sections, that are placed in an external multi-pole field of order N=2 created by a stationary superconducting field coil. The three armature coils of each rotor section are oriented such that the spatial angles of their magnetic axes are 120° apart and the respective coils in each armature section are connected in series so the generated voltages in the coils of the two sections are added. Other embodiments of this machine can be made with four and more pole configurations for both the rotor and field coils.

As set forth in the present invention, the armature of a machine consists of two separate sets of coils, one set placed in the aperture of the field coil to link flux inside the field coil and the other set placed outside the field coil to link with the flux external to the field coil, which results in approximately doubling the flux linkage between the armature coils and the field coil, thus approximately doubling the generated voltage. Furthermore, if the generated voltage is doubled, the power of the machine is increased by a factor of four with the same load resistance.

The greatest amount of magnetic flux for a modest size and weight device is achieved by using a superconductor for the field coil. It is not practical to use a field coil with an iron core and resistive material for its windings because the magnetic field that can be achieved is not sufficient to produce a high power output. The armature coils could be made with either superconductor or normal conductor materials, depending on the requirements for the electrical device.

The dual armature machine disclosed in this document uses a completely different principle than that of Lewis and LeFlem machine configuration. For example, the single field coil in the present invention is placed in a radial gap between two concentric cylindrical armature coils. Relative rotational motion between the field and armature coils in the present invention can be achieved by having either one be the rotor, while a preferred configuration would be for the armature coils to be the rotor.

By using two armature coil sections, one inside the field coil aperture and the other external to the field coil, the flux linkage between the armature and superconducting field coil can be approximately doubled. This is a more efficient use of the superconductor. The increased flux linkage in the invented technology produces a substantially higher voltage than can be obtained with current conventional superconducting machine technology. It should be noted that if the generated voltage of an electrical machine is doubled, then the power of the machine is increased by a factor of four using the same external load resistance. This configuration yields a substantial power density improvement for an electrical machine. This dual armature configuration enables a machine that can produce high voltage even at low rotor speeds, and is very desirable for applications such as a wind turbine generator or propulsion motor.

Figure 4:
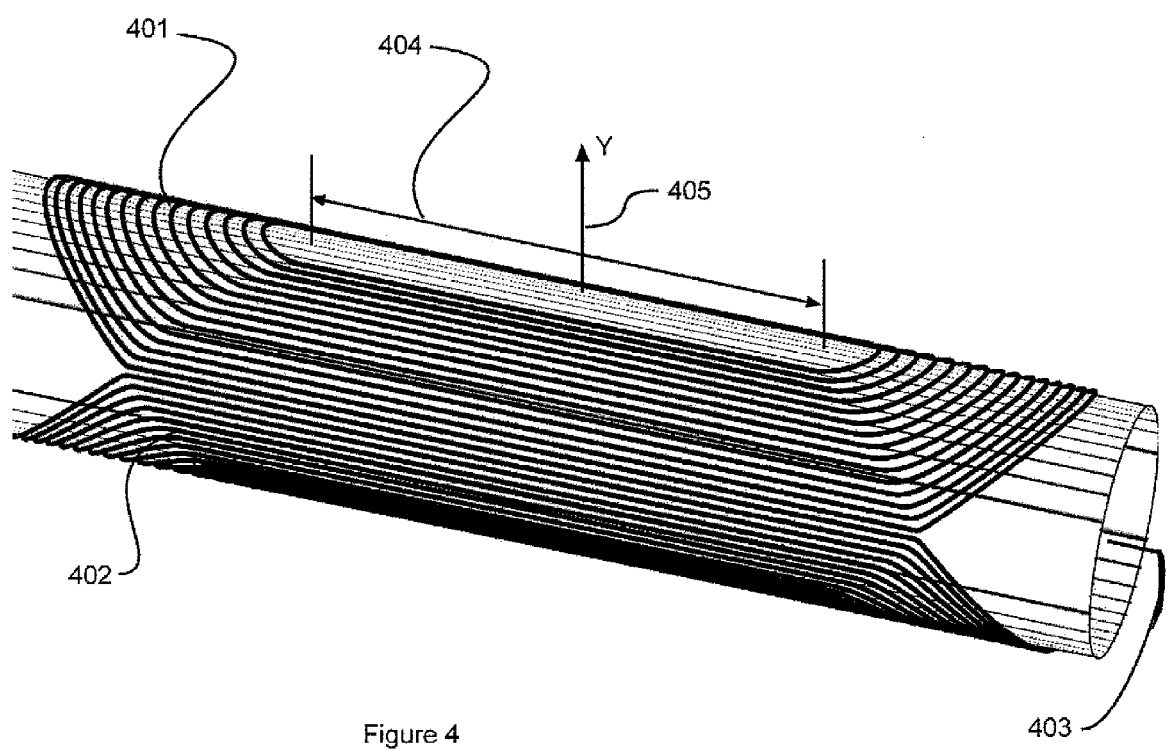

This invention discloses superconducting electric machines that use a plurality of multi-turn coils in the armature in an externally excited field. The armature is a dual configuration of two concentric cylindrical sections with the field coil placed between them. For the device disclosed in this patent, it is most suitable to use field and armature coils of the "double-helix" configuration shown in FIG. 2. However, other cylindrical coil configurations, such as the race track winding shown in FIG. 4, could be used.

With reference to FIG. 1, the advantage of this dual-armature technique can be illustrated by using a two pole machine, whose coil cross-section is shown in FIG. 1. The dual armature consists of an inner section (103) and an outer section (101), each consisting of multi-turn coils. A field coil (102) is situated between the two armature coil sections. The field coil (102) generates the magnetic field indicated by the directional arrows (104, 105). Thus, the inner section (103) of the armature links with the flux (104) inside the aperture of the field coil while the outer section (101) links with the flux (105) on the outside of the field coil. With the inner and outer sections of the armature coils connected in series, almost twice the voltage can be generated in the armature coils than with a conventional machine that links flux from a comparable field coil with only one armature coil section.

The field calculation for the dual armature shown in FIG. 1 uses a 6-layer Double-Helix Dipole (DHD) field coil in the region between the inner and outer sections of the armature. The geometry of DHD coils is described in FIG. 2. The dual armature uses three 4-layer DHD coils in each of the armature sections. The armature coil poles are 120° apart in both the inner and outer sections of the armature, for a three-phase configuration. This dual armature effectively doubles the number of turns that would be used in either the synchronous or DC type machine. The two coil sections of the dual armature, when connected in series, produce almost twice the voltage of one of the sections alone. Space is provided between the field coil and the armature coil sections to allow for structural reinforcement of the coils and thermal insulation of the superconducting field coil.

The calculations show that the field intensity (104) inside the aperture of the field coil is uniformly high while the field intensity (105) on the outside of the coil is lower and decreases with the radial distance. Consequently the coil turns of the inner armature section are exposed to a higher field than those of the outer armature section. The linked flux per coil equals the area of the coil times the field intensity, and the inner armature coils have a smaller radius and thus less surface area than the outer armature coils. However, if the inner and outer coils have the same total length, the inner coils could have more turns of superconductor than the outer coils, as discussed in FIG. 2. The result is that the inner and outer armature sections can be designed so that they each link almost the same amount of flux.

Figure 2:
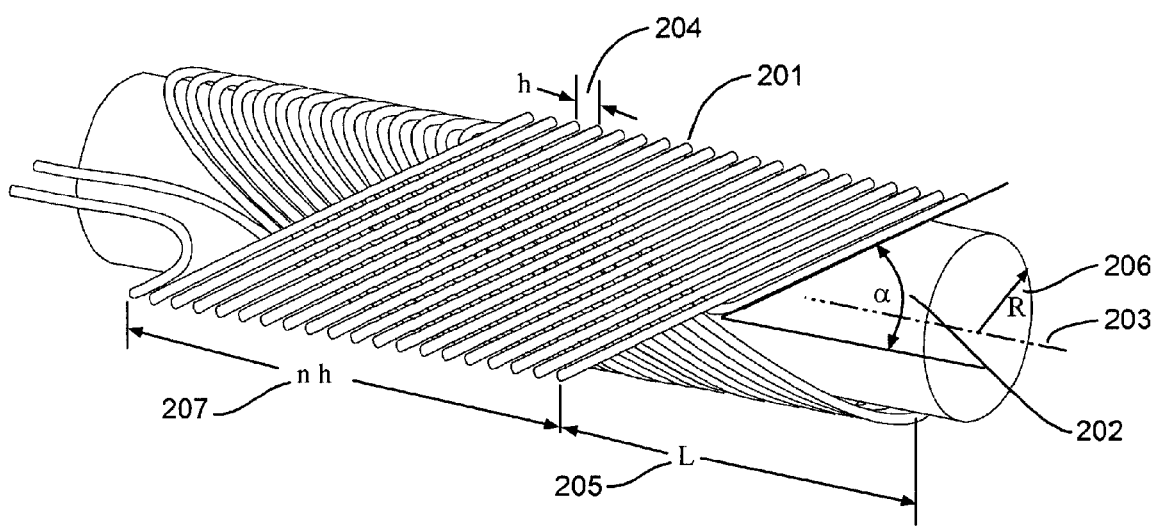
FIG. 2 is a view of the coil geometry in a double-helix dipole.

With respect to FIG. 2, the present invention is described that includes the use of "double-helix coils" for the field excitation and armature coils. The double-helix dipole (DHD) coils are composed of multi-layer pairs of cylindrical coils that are wound as tilted loops that make an angle with the coil axis. The tilt angles of the 2 coils in a pair are opposite so that the axial components of the magnetic field cancel and the resultant is a transverse magnetic field, perpendicular to the coil axis. The use of DHD coils in this disclosed device facilitates the computation of the estimated performance of the machine. Most importantly, this configuration provides a lower cost and more easily manufactured super conducting device than can be obtained using conventional coils wound in a race track configuration.

The geometry of the double-helix superconducting multi-turn coils that can be used in this disclosed invention is especially suitable for the application of high temperature superconductors. These materials are inherently brittle in nature and suffer degradation of superconducting properties when specified strain limits are exceeded. However, the double-helix coils can be easily designed so that the coil winding process will accommodate the allowable minimum bend radius that will prevent degradation of the superconductor.

The double-helix dipole (DHD) coils are composed of multi-layer coils of the type shown in FIG. 2. FIG. 2 shows the coil turns as tilted loops (201) that make an angle, $\alpha$ (202), with the coil axis (203). The turns have an axial spacing, h (204). The end section of each coil layer has an overhang length, L (205), that is equal to 2 times the coil radius, R (206), divided by tan $\alpha$. Thus, if there are n coil loops, the total length of the coil layer is equal to the overhang L (206) plus the product (207) of n times h.

In the preferred embodiment of this machine, the number of turns in the smaller radii inner coils of the armature is increased in order to make the total length of each coil the same as the length of the longest coil (the outer-most armature coil). In this way the flux linkage and thus the generated voltage can be optimized for this embodiment of the machine.

The use of DHD coils in this example facilitates the computation of the estimated performance of the machine and, most importantly, provides a lower cost and more easily manufactured super conducting device than can be obtained using conventional coils wound in a race track configuration, although that configuration can also be used in this type of machine. The double-helix design configuration used in the present invention is shown in FIG. 2 is described in U.S. Pat. No. 6,921,042B1 "Concentric Tilted Double-helix Dipoles and Higher-order Multipole Magnets," Goodzeit et al., issued on Jul. 26, 2005.

The objective of this design is to provide a high power density machine especially suitable for use at low rotor speeds such as for a wind turbine generator or a marine propulsion motor. In most applications the field coil will be stationary and the armature coils will be on a rotor, so that is the implementation that is discussed. However the same principles could apply for a stationary dual section armature with a rotating field coil between its 2 sections.

Since the power density is related to the flux linkage between the armature and field, we can aim for the highest power density from the following considerations:

The Field Coil: The use of a high-field superconducting field coil is an essential requirement for this design in order to provide the highest field using the smallest mass of conductor. Thus, this design is especially useful if the highest current density superconducting material can be used in the field coil. An LTS (Low Temperature Superconductor) material such as NbTi in a 6-layer double-helix coil can easily achieve a flux density (field strength) in the aperture of the field coil of greater than 4 T. However, such conductors operate at ~4.3K and thus would be feasible only if the heat gain from external sources can be kept low enough. Since the field coil operates at DC, the AC losses in the field coil can be negligibly small.

However, the large torque produced by a low speed, high power machine requires a substantial cross section of high strength material to support the field coil to the frame of the machine to resist this torque. Thus, the design features a low heat leak, high torque capacity support system for the field coil. Using this technique, the refrigeration requirements for the field coil can be reduced to a level low enough to be supplied by commercially available cryocoolers operating in that temperature range. Other sources of heat leak into the machine, such as radiation, are mitigated by the use of multilayer insulation for the field coil cold mass and thermal shields surrounding it.

Armature Coils: Since the design incorporates a field coil essentially encapsulated by the rotating armature coils, it is convenient to use these armature coils as a cryogenic shield for the field coil. Thus, the armature coils could use either a cryogenically operating normal conducting material, an HTS (High Temperature Superconductor) material, or an LTS (Low Temperature Superconductor) material such as NbTi. Even though the armature rotates in a constant field, the direction of the field seen by the armature conductor reverses during every revolution of the armature, thus inducing AC losses in the superconductor as well as eddy current losses in the resistive material used in the armature construction. Thus, the decision on the use of an LTS or HTS material for this application would depend on refrigeration requirements for the rotor. However, using a resistive material operating at 80K provides a very compact, high density design.

Type of Machine: A "DC type" of machine is especially suitable for use of the dual armature feature. The use of a three-phase winding for the rotor armature coils, coupled with a full-wave three-phase rectifier, can easily allow a high DC voltage (i.e. 12,500 VDC) in a compact machine.

Figure 3:
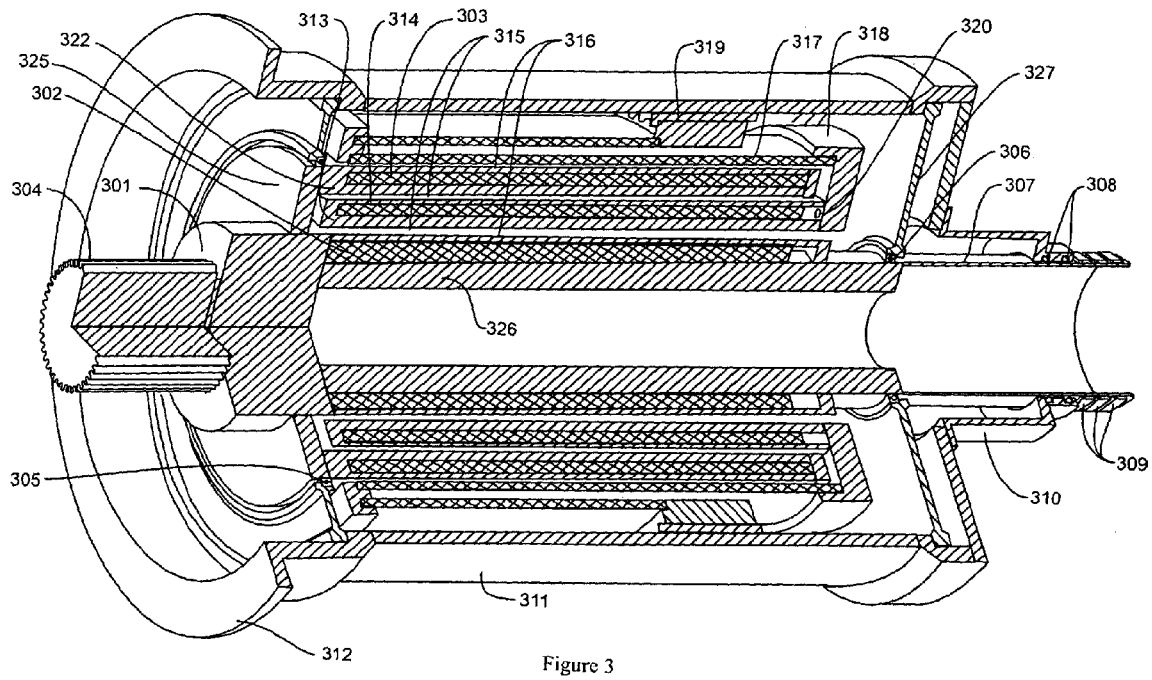
FIG. 3 shows principle design features of an embodiment of the invention; and, FIG. 4 shows coil geometry in a race-track dipole configuration for an embodiment of the invention.

FIG. 3 shows an isometric cross section of the preferred embodiment of the machine. A freely rotating dual armature has inner (302) and outer (303) armature sections that are separated by a radial distance that permits the placement of the stationary field coil (314) between them. The assembly (described in detail below) has its electrical and cryogenic connections at one end (shown on the right) and its mechanical connections at the other end (shown on the left). The entire rotor and field coil assembly is in a vacuum environment within the outer shell that is composed of a long section (311) and 2 end sections (310, 312).

The field coil (314) has support and confinement pieces (313) that entirely encapsulate the coil. A utility tube (not shown) provides the cryogen supply and exhaust for the field coil. It also includes current leads that make a transition from the superconducting to the normal state. This utility tube would pass through the outer shell (311) and attach to the field coil enclosure volume (313) at the hole (320). The field coil cryogenic mass (313,314) may also be insulated with layers of multilayer insulation (not shown) in the space (315) in order to reduce the radiation heat the field coil would receive.

A connecting hub (318) is used to form a structural bridge from the field coil assembly (313,314) to a high torque, low heat leak cylindrical shaft assembly (317). This shaft assembly connects via a splined connection (319) to the vacuum tank shell (311) of the frame of the machine. The frame of the machine is connected to a base plate (not shown) by means of supports (not shown).

The dual armature sections (302, 303) are mounted on a rotor assembly with an external hub (301) and inner shaft (326). A structural piece (327) attached to the machine frame (311) supports the other end of the rotor. Bearings (305, 306) at each end of the rotor allow it to rotate freely. The inner armature section (302) is supported on the inner shaft portion (326) of the rotor hub and the outer armature section (303) is supported on a cylindrical base (322) that is connected to the external rotor hub (301) by means of the connecting hub (325).

If their coils are to be cryogenically cooled, the armature sections would each have additional support and confinement pieces (316) that entirely encapsulate them. Utility passages (not shown) in the rotor end hub pieces (301, 325) would allow for connections for the electrical wiring, cryogen supply and exhaust for the rotor coils. The electrical and cryogen lines would go through the hollow interior of the shaft (326). At one end of the rotor, the hub (301) is connected to a high torque capacity connection such as a splined coupling (304). This end of the rotor could be connected to an extension shaft (not shown) that mates with the splined connection (304). The purpose of such an extension shaft is to provide a high torque capacity, low heat leak shaft for transmitting mechanical power to or from this machine. Such an extension shaft is housed in a vacuum tank closure (not shown) that is assembled to the end flange (312) of the electrical machine.

At the other end of the rotor, the shaft (326) is connected to a low heat leak utility tube (307) with bearing and seal assemblies (308) that are mounted in the end closure (310). The utility tube provides access to the inner region of the rotor shaft (326) to permit the passage of electrical leads and cryogenic supply and return for the armature coils.

An assembly of brushes (309) may connect the armature coils to an external rectifying circuit (not shown) that converts the AC voltage of the coils to DC. Other aspects of this invention include a method of supporting the field coil cold mass (313, 314). The loads that need to be managed include gravity, inertia, and the reaction torque produced on the field coils. For the case of high power, low speed applications the reaction torque can be many times greater than the gravity and inertia loads on the structure.

Thus, in order to manage the reaction torque, this aspect of the invention includes a low heat leak, high strength, reaction torque assembly (317, 319). This assembly consists of a nested set of connected concentric cylinders of high strength, low heat leak material that form a long path between the cryogenic environment of the field coil and the ambient temperature of the environment. In order to engage the reaction torque assembly to the frame of the machine (i.e. the vacuum tank), a splined connection (319) is provided so that the reaction torque assembly can be assembled into the machine and transmit the torque from the field coils to the frame with high strength joints. This construction technology has been described in U.S. patent application No. 61/041,673 for "Low Heat Leak, High Torque Power Shaft for Cryogenic Machines," submitted Apr. 2, 2008 by Carl L. Goodzeit.

In order to provide an enhanced magnetic field for the machine, the assembly can be provided with an external layer of iron (not shown) that can be placed around the periphery of the vacuum tank (311). The iron provides a lower reluctance return path for the flux which increases the field intensity of the coils and provides shielding of the stray magnetic field.

The field map shown in FIG. 1 was calculated using double helix geometry coils that were illustrated in FIG. 2. However, any dipole magnet with a vertical field inside its circular aperture would create the same field pattern. A common configuration that has been used for superconducting magnets is the race track configuration, illustrated in FIG. 4.

Racetrack coils are so-called because the superconductor windings (401, 402) follow a path similar in shape to a long racetrack oval. The coil turns in the long sections (404) are parallel to the axial direction Z (403) of the cylindrical coil. The two windings (401, 402) of a dipole racetrack coil create a magnetic field in the Y-direction (405) in the straight section (404) of the coil.

The superconducting coils will require a cryogenic system and vacuum vessel with seals and bearings plus electrical leads that can transition between ambient and superconducting temperature. All of these components can be supplied by currently existing cryogenic technology.

The polarity of the electromagnetic frequency in each coil changes as the armature rotates in the field. Thus, in a generator the output voltage of each coil needs to be rectified in order to produce a unidirectional (or DC) current. In the preferred embodiment of the invention, this rectification is accomplished by connecting the coil ends to slip rings from which the current is transferred by means of brushes to a rectifier. Thus, with three armature coils, three slip rings can be used with brushes and a three-phase full-wave bridge rectifier to produce a DC current equal to the summation of the current in each of the three coils at a voltage that is almost as great as the peak generated voltage of each coil.

The preferred embodiment configuration of the present invention will also work as a motor with DC current supplied to the device. Furthermore, without the use of external rectification, the machine can emulate an AC 3-phase generator or a synchronous motor. In the embodiment of this machine using superconducting coils in both the armature and field coils, "superconducting current leads" that make a transition from the cryogenic environment to the ambient temperature region are used. Such leads are commercially available and are known to have a very low level of thermal loss to the cryogenic region.

The present technology can be used with wind turbines, which are characterized by having a very low-speed power source, such as a typically 12-20 rpm propeller drive. The conventional technology for wind turbines requires the use of a gear box to increase the speed of the electric generator to be compatible with the generation of power by conventional machines. However, the gear box for high power wind turbines is a technically difficult, massive component of considerable expense. The ability of the invented fully-superconducting machine to develop a high voltage at low speed using a plurality of multi-turn coils on the rotor and a high-field superconducting field coil enables the generation of electric power using a direct device, and thus eliminates the expensive gear box.

The present technology can be used with marine propulsion motors, which are required to have high power density (i.e. a high power to weight ratio), operate at low speed (i.e. typically 120 rpm), and have a very high power output (i.e. 25 MW or higher). The two types of superconducting machines that have been used for marine propulsion applications are the homopolar machine and the AC synchronous machines. Homopolar motors are sought as a desirable technology for this application, as discussed by Superczynski in the paper that was cited in the Background section discussion of Prior Art. However, conventional homopolar motors have serious drawbacks that include excessively high current supply to achieve even moderate power levels and the inability to use a completely superconducting machine (i.e. both superconducting field coils and superconducting rotor coil).

Existing technology marine prolusion motors are also based on the use of synchronous motor technology (AC) machines that use a superconducting rotor (field coil) and a normal conducting stator (armature). The invented technology can effectively double the flux linkage between the field and armature, thus doubling the back emf of the motor at a given speed and increasing the power by a factor of four. This amounts to increasing the power density for a given size motor by a factor of four and thus provides an important improvement for marine propulsion motors.

The present technology can be used with electric motors, which can be considered for aircraft propulsion if they have a high enough power to weight ratio. The disclosed invention has the advantage of the ability to provide an approximately 4 times higher power to weight ratio than existing types of electric propulsion motors. This dual armature motor could operate at the higher speeds (e.g. 1200 rpm) that would be suitable for a propeller-driven craft.

The present technology can be used with generation of hydroelectric power. The present invention is especially suitable for low speed, high torque applications and thus can be driven by a hydraulic turbine. Hydraulic power generation would benefit by the use of this invention to reduce the size and mass, and to increase the power density of the generator.

While the invention has been described, disclosed, illustrated and shown in various terms of certain embodiments or modifications which it has presumed in practice, the scope of the invention is not intended to be, nor should it be deemed to be, limited thereby, and such other modifications or embodiments as may be suggested by the teachings herein are particularly reserved, especially as they fall within the breadth and scope of the claims here appended.

Having described the invention, we claim:

1. A motor/generator machine for producing motor forces or generating electrical power comprising:
    a superconducting 2-pole field coil of a cylindrical configuration having a first longitudinal axis that is aligned along the center point of the cylindrical field coil, said field coil configured to produce an internal magnetic field that is transversely disposed in a first direction from said longitudinal axis and said magnetic field having a return flux that is external to said field coil;
    an internal armature of a cylindrical configuration having a second longitudinal axis that is parallel to the first longitudinal axis, said internal armature being placed within said field coil such that there is a radial spacing distance between an exterior surface of the internal armature and an internal surface of the field coil, said internal armature having at least one 2-pole coil that links with the internal flux created by the field coil;
    an external armature of a cylindrical configuration having a third longitudinal axis that is parallel to the first longitudinal axis, said external armature being placed outside said field coil such that there is a radial spacing distance between the interior surface of the external armature and the exterior surface of the field coil, said external armature having at least one 2-pole coil that links with said external return flux created by the field coil, and said internal and external armatures are coupled together so to form a unified armature assembly.

2. The motor/generator of claim 1 wherein the armature assembly is rotatable.

3. The motor/generator of claim 1 wherein the field coil is rotatable.

4. The motor/generator of claim 1 wherein the internal armature is made of a superconducting material.

5. The motor/generator of claim 1 wherein the field coil is made of a high temperature superconducting (HTS) material.

6. The motor/generator of claim 1 wherein the external armature is made of a superconducting material.

7. The motor/generator of claim 1 wherein at least one of said internal or external armature have a multi-phase armature of n-phases and a plurality of coils so that the magnetic axis of each coil is azimuthally spaced at 360°/n from a neighboring coil.

8. The motor/generator of claim 1 wherein at least one of said field, internal armature, or external armature coils have four or more poles.

9. The motor/generator of claim 1 further comprising:
    a connector between at least one of said internal or external armatures and a large shaft for transmitting mechanical power to or from the machine,
    a supporter assembly for supporting a rotor with bearings;
    a connector between at least one of said internal or external armatures and a small shaft, said small shaft provides a mounting for a current transfer device having collectors and brushes, and said small shaft providing access to the interior of the rotor to supply and exhaust coolant for at least one of said internal or external armature coils.

10. The motor/generator of claim 1 wherein at least one of said field or armature coils are double-helix coils.

11. The motor/generator of claim 1 further comprising:
    a cryogenic containment vessel that maintains a refrigerant around the superconducting field coils, said superconducting field coil being supported directly by the containment vessel.

12. The motor/generator of claim 11 wherein the armature sections of the rotor are each cooled by a cooling system that may be separate from that of the field coil.

13. The motor/generator of claim 11 further comprising a vacuum vessel that houses said field coil, armature sections, and associated cooling systems, wherein the rotor shaft ends extend out of the vacuum environment with a bearing and seal assembly to permit rotation of the rotor and prevent leakage, said vacuum vessel forming a frame of the machine having a mounting surface.

14. A motor/generator machine for producing motor forces or generating electrical power comprising:
    a superconducting 2-pole field coil of a cylindrical configuration having a first longitudinal axis that is aligned along the center point of the cylindrical field coil, said field coil configured to produce an internal magnetic field that is transversely disposed in a first direction from said longitudinal axis and said magnetic field having a return flux that is external to said field coil;
    a internal armature of a cylindrical configuration having a second longitudinal axis that is parallel to the first longitudinal axis, said internal armature being placed within said field coil such that there is a radial spacing distance between an exterior surface of the internal armature and an internal surface of the field coil, said internal armature having at least one 2-pole coil that links with the internal flux created by the field coil;
    a external armature of a cylindrical configuration having a third longitudinal axis that is parallel to the first longitudinal axis, said external armature being placed outside said field coil such that there is a radial spacing distance between the interior surface of the external armature and the exterior surface of the field coil, said external armature having at least one 2-pole coil that links with said external return flux created by the field coil, and said internal and external armatures are coupled together so to form a unified armature assembly;
    a connector between at least one of said internal or external armatures and a large shaft for transmitting mechanical power to or from the machine;
    a rotor having a small shaft on a first end and a large shaft on a second end, said armature connected to the small and large shafts of said rotor;
    a supporter assembly for supporting said rotor with bearings;
    a connector between at least one of said internal or external armatures and said small shaft, said small shaft provides a mounting for a current transfer device having collectors and brushes, and said small shaft providing access to the interior of the rotor to supply and exhaust coolant for at least one of said internal or external armature coils.

15. The motor/generator of claim 14 wherein said rotor shaft extends out the motor/generator with a bearing and seal assembly to permit rotation of the rotor and prevent leakage of the refrigerant.

16. The motor/generator of claim 14 wherein high temperature superconducting materials are used for at least one of the field or armature coils.

17. The motor/generator of claim 14 wherein low temperature superconducting materials are used for at least one of the field or armature coils.

18. The motor/generator of claim 14 wherein non-superconducting materials are used for at least one of the armature coils.

19. A motor/generator machine for producing motor forces or generating electrical power comprising:
- a superconducting 2-pole field coil of a cylindrical configuration having a first longitudinal axis that is aligned along the center point of the cylindrical field coil, said field coil configured to produce an internal magnetic field that is transversely disposed in a first direction from said longitudinal axis and said magnetic field having a return flux that is external to said field coil;
- an internal armature of a cylindrical configuration having a second longitudinal axis that is parallel to the first longitudinal axis, said internal armature being placed within said field coil such that there is a radial spacing distance between an exterior surface of the internal armature and an internal surface of the field coil, said internal armature having at least one 2-pole coil that links with the internal flux created by the field coil;
- an external armature of a cylindrical configuration having a third longitudinal axis that is parallel to the first longitudinal axis, said external armature being placed outside said field coil such that there is a radial spacing distance between the interior surface of the external armature and the exterior surface of the field coil, said external armature having at least one 2-pole coil that links with said external return flux created by the field coil, and said internal and external armatures are coupled together so to form a unified armature assembly;
- a rotor having a small shaft on a first end and a large shaft on a second end, said armature connected to the small and large shafts of said rotor;
- a connector between at least one of said internal or external armatures and said large shaft for transmitting mechanical power to or from the machine,
- a supporter assembly for supporting said rotor with bearings;
- a connector between at least one of said internal or external armatures and said small shaft, said small shaft provides a mounting for a current transfer device having collectors and brushes, and said small shaft providing access to the interior of the rotor to supply and exhaust coolant for at least one of said internal or external armature coils.

20. The motor/generator of claim 19 wherein the assembly is used as a marine propulsion motor.

21. The motor/generator of claim 19 wherein the assembly is used as an aircraft propulsion motor.

22. The motor/generator of claim 19 wherein the assembly is used as an electric generator driven by wind power.

23. The motor/generator of claim 19 wherein the assembly is used as an electric generator driven by a hydraulic turbine.

* * * * *